(12) United States Patent
Morino et al.

(10) Patent No.: US 12,287,679 B2
(45) Date of Patent: Apr. 29, 2025

(54) ELECTRONIC APPARATUS AND METHOD FOR MANUFACTURING ELECTRONIC APPARATUS

(71) Applicant: Lenovo (Singapore) Pte. Ltd., Singapore (SG)

(72) Inventors: Takayuki Morino, Kanagawa (JP);
Takehito Yamauchi, Kanagawa (JP);
Shigehiro Horiuchi, Kanagawa (JP);
Daisuke Takahashi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 234 days.

(21) Appl. No.: 18/167,895

(22) Filed: Feb. 13, 2023

(65) Prior Publication Data

US 2023/0288964 A1    Sep. 14, 2023

(30) Foreign Application Priority Data

Mar. 11, 2022    (JP) .................................. 2022-038241

(51) Int. Cl.
   *G06F 1/16*    (2006.01)
(52) U.S. Cl.
   CPC .......... *G06F 1/1656* (2013.01); *G06F 1/1616* (2013.01); *G06F 1/1681* (2013.01)
(58) Field of Classification Search
   CPC .... G06F 1/1656; G06F 1/1616; G06F 1/1681; G06F 1/1652; G06F 1/1641; G09F 9/301
   See application file for complete search history.

(56) References Cited

U.S. PATENT DOCUMENTS

| 8,787,016 B2 * | 7/2014 | Rothkopf ............. G06F 1/1681 |
| | | 361/679.55 |
| 9,250,733 B2 * | 2/2016 | Lee ........................ G06F 1/1641 |
| 10,481,634 B2 * | 11/2019 | Mizoguchi ............ G06F 1/1616 |
| 2014/0029171 A1 | 1/2014 | Lee |

(Continued)

FOREIGN PATENT DOCUMENTS

| CN | 210839658 U | 6/2020 |
| CN | 111968515 A | 11/2020 |

(Continued)

OTHER PUBLICATIONS

Extended European Search Report issued in corresponding European Application No. 23158491.3 mailed Aug. 1, 2023 (8 pages).

*Primary Examiner* — Anthony M Haughton
*Assistant Examiner* — Hung Q Dang
(74) *Attorney, Agent, or Firm* — Osha Bergman Watanabe & Burton LLP

(57) ABSTRACT

An electronic apparatus includes: a first chassis member; a second chassis member that is adjacent to the first chassis member and relatively rotatably connected to the first chassis member; a first plate that is supported by the first chassis member; a second plate that is supported by the second chassis member and aligned with a gap between the first plate and the second plate; a display that is formed in a flexible sheet shape, and has a first region fixed to a front surface of the first plate, a second region fixed to a front surface of the second plate, and a folding region capable of being folded and provided to straddle a gap between the first region and the second region; and a first fastening portion that fixes the first plate to the first chassis member.

7 Claims, 9 Drawing Sheets

(56) References Cited

U.S. PATENT DOCUMENTS

| | | |
|---|---|---|
| 2018/0284839 A1 | 10/2018 | Lin |
| 2020/0267856 A1 | 8/2020 | Hsu |
| 2021/0341972 A1* | 11/2021 | Togashi ................ G06F 1/1652 |

FOREIGN PATENT DOCUMENTS

| | | |
|---|---|---|
| CN | 112769982 A | 5/2021 |
| CN | 112911038 A | 6/2021 |
| CN | 113141422 A | 7/2021 |
| CN | 113286023 A | 8/2021 |
| CN | 113315857 A | 8/2021 |
| JP | 2014-161009 A | 9/2014 |
| JP | 2018-097420 A | 6/2018 |
| JP | 2021-179804 A | 11/2021 |
| JP | 6971354 B2 | 11/2021 |
| WO | 2016/080239 A1 | 5/2016 |

* cited by examiner

ELECTRONIC APPARATUS AND METHOD FOR MANUFACTURING ELECTRONIC APPARATUS

CROSS-REFERENCE TO RELATED APPLICATIONS

This application claims priority to Japanese Patent Application No. 2022-038241 filed on Mar. 11, 2022, the contents of which are hereby incorporated herein by reference in its entirety.

BACKGROUND

Technical Field

The present invention relates to an electronic apparatus in which a plurality of chassis members are relatively rotatably connected, and a method for manufacturing the electronic apparatus.

Description of Related Art

The present applicant proposes an electronic apparatus configured such that not only a chassis but also a display is capable of being folded by using a flexible display such as organic electro luminescence (EL) (see Japanese Patent Publication No. 6971354).

A flexible display has a folding region at a position straddling left and right chassis members. The folding region needs to be in a free state without being fixed to other members. For this reason, the folding region of the display produces protruding wrinkles and waves when opened into a flat plate shape, thereby degrading visibility and appearance quality.

Therefore, Japanese Patent Publication No. 6971354 proposes a method capable of applying tension to the folding region when the plates are returned to the flat plate shape by disposing two plates whose adjacent edge portions come into contact with each other in a substantially V shape to fix the display. However, in the method, the tension of the folding region is realized when the two plates come into contact with each other. For this reason, it is not possible to apply the method to a configuration in which the adjacent edge portions of the two plates do not come into contact with each other, for example, a gap is provided between the two plates, and other parts, such as a hinge device, are disposed in the gap.

SUMMARY

The present invention has been made in consideration of the above problems of the related art, and an object of the present invention is to provide an electronic apparatus capable of suppressing occurrence of wrinkles in a display having a foldable region, and a method for manufacturing the electronic apparatus.

An electronic apparatus according to a first aspect of the present invention includes a first chassis member, a second chassis member that is adjacent to the first chassis member and relatively rotatably connected to the first chassis member, a first plate that is supported by the first chassis member, a second plate that is supported by the second chassis member and aligned with a gap between the first plate and the second plate, a display that is formed in a flexible sheet shape, and has a first region fixed to a front surface of the first plate, a second region fixed to a front surface of the second plate, and a folding region capable of being folded and provided to straddle a gap between the first region and the second region, a first fastening portion that fixes the first plate to the first chassis member, a second fastening portion that fixes the second plate to the second chassis member, and a pressing member that applies tension to the folding region of the display by pressing the first plate to the first chassis member toward a separation direction separated from the second plate.

A method for manufacturing an electronic apparatus according to a second aspect of the present invention is a method for manufacturing an electronic apparatus including a first chassis member and a second chassis member that are relatively rotatably connected to each other, the method includes a first step of fixing a first region of a display formed in a flexible sheet shape to a front surface of a first plate, fixing a second region to a front surface of a second plate arranged with a gap between the first plate and the second plate, and causing a state in which a folding region capable of being folded straddles a gap between the first region and the second region, a second step of fixing the second plate to the second chassis member after the first step, a third step of pressing the first plate to the first chassis member toward a separation direction separated from the second plate by attaching a pressing member to the first plate, and applying tension to the folding region of the display after the second step, and a fourth step of fixing the first plate to the first chassis member in a state in which the tension is still applied to the folding region of the display after the third step.

According to the aspects of the present invention, it is possible to suppress occurrence of wrinkles in a display having a foldable region.

DETAILED DESCRIPTION

An electronic apparatus according to the present invention will be described in detail below with preferred embodiments with reference to the accompanying drawings.

Figure 1:
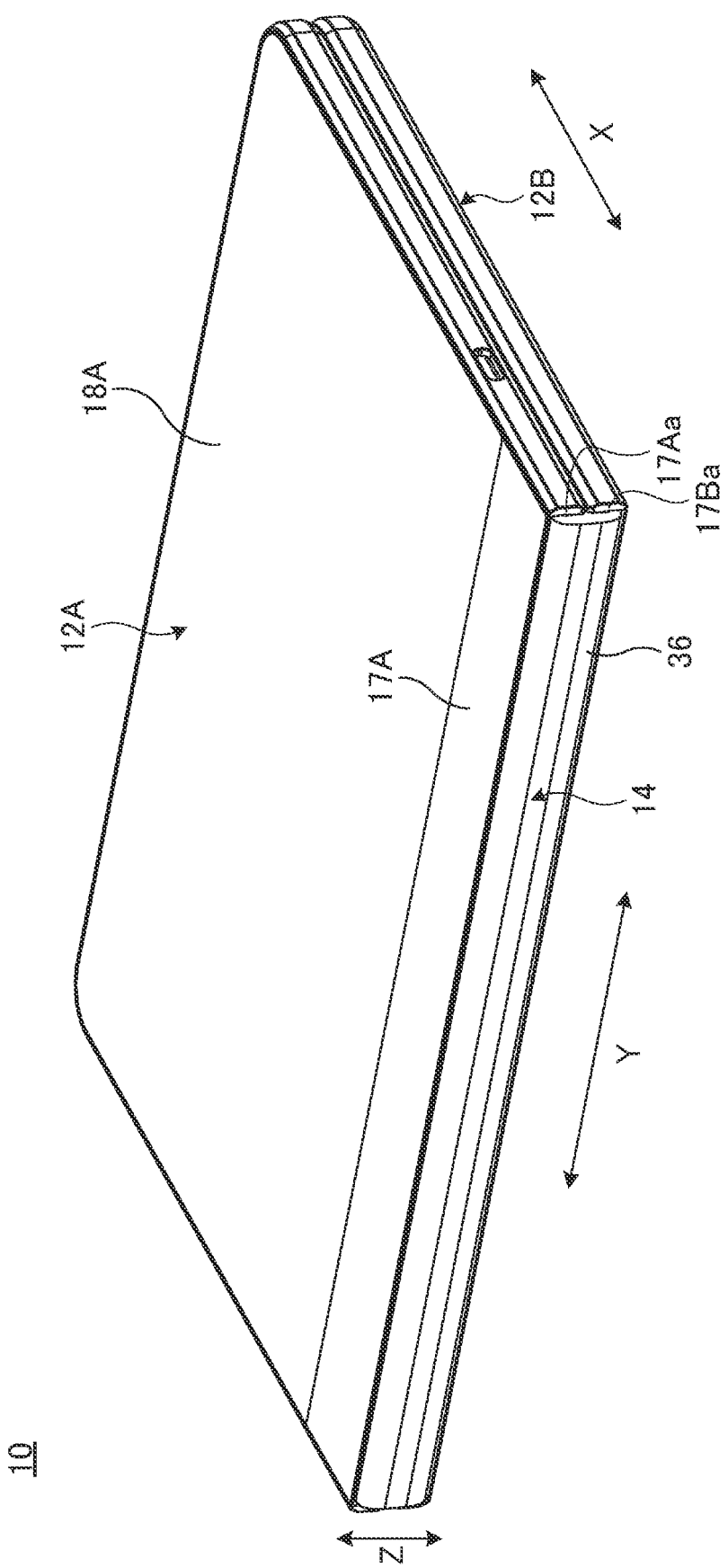
FIG. 1 is a perspective view schematically illustrating a state in which an electronic apparatus according to an embodiment is closed and in a 0-degree posture.
Figure 2:
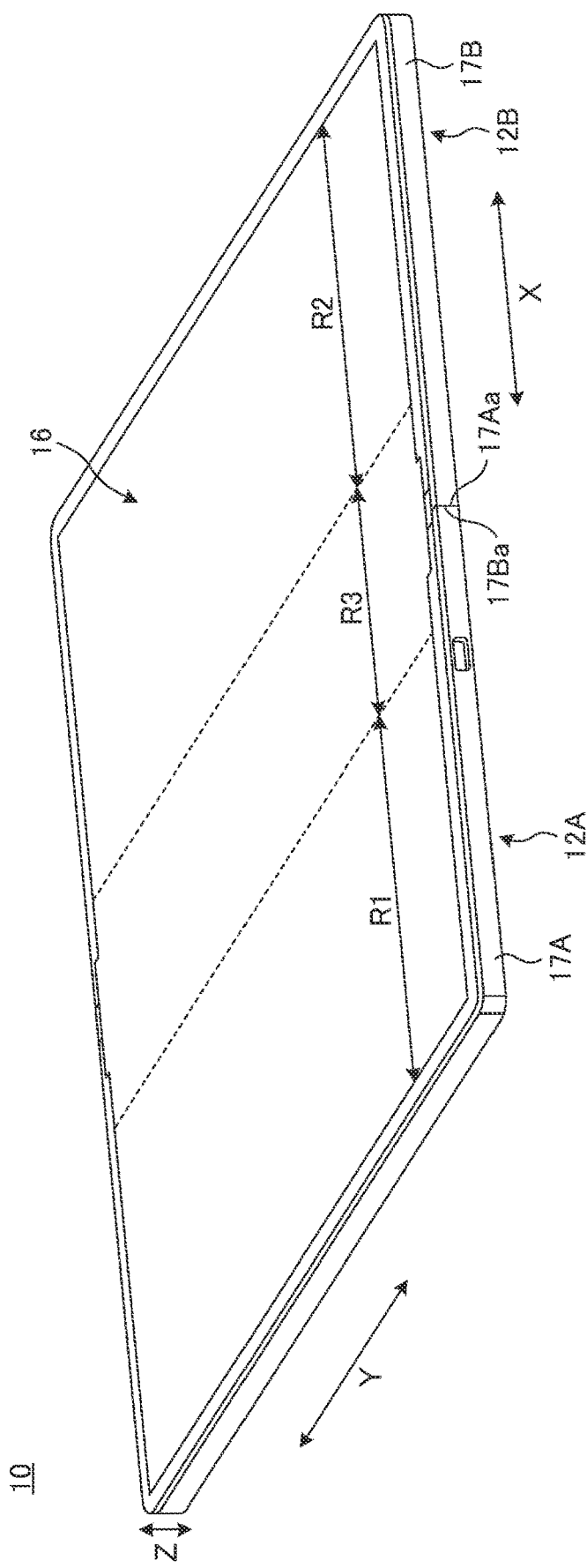
FIG. 2 is a perspective view schematically illustrating a state in which the electronic apparatus illustrated in FIG. 1 is opened and in a 180-degree posture.
Figure 3:
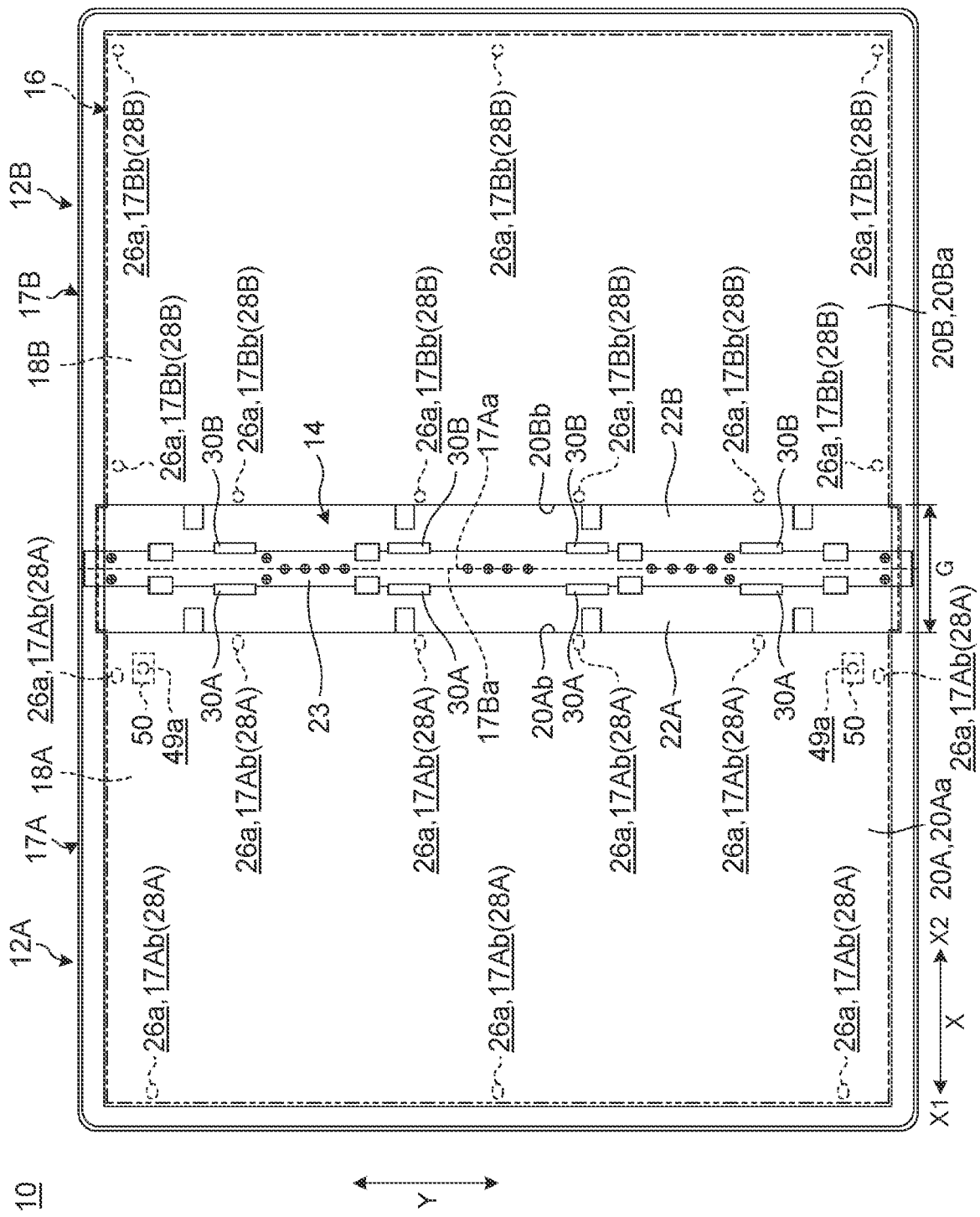
FIG. 3 is a plan view schematically illustrating an internal structure of the electronic apparatus illustrated in FIG. 2.

FIG. 1 is a perspective view schematically illustrating a state in which an electronic apparatus 10 according to an embodiment is closed and in a 0-degree posture. FIG. 2 is a perspective view schematically illustrating a state in which the electronic apparatus 10 illustrated in FIG. 1 is opened and in a 180-degree posture. FIG. 3 is a plan view schematically illustrating an internal structure of the electronic apparatus 10 illustrated in FIG. 2.

As illustrated in FIGS. 1 to 3, the electronic apparatus 10 includes a first chassis 12A, a second chassis 12B, a hinge device 14, and a display 16. The electronic apparatus 10 of the present embodiment exemplifies a tablet PC or a notebook PC that is capable of being folded like a book. The electronic apparatus 10 may be a smartphone, a portable game machine, or the like.

Each of the chassis 12A and 12B is disposed adjacent to each other. The first chassis 12A includes a first chassis member 17A and a first cover member 18A. The first chassis member 17A is a rectangular frame-shaped member having standing walls formed on three sides other than the first edge portion 17Aa adjacent to the second chassis 12B. The first cover member 18A is a plate-shaped member that closes the rear surface opening of the first chassis member 17A (see also FIG. 5). Similarly, the second chassis 12B includes a second chassis member 17B that has standing walls formed on three sides other than the second edge portion 17Ba adjacent to the first chassis 12A, and a second cover member 18B that closes a rear surface opening of the second chassis member 17B. The front surface openings of the chassis members 17A and 17B are closed with the display 16.

Each of the members 17A, 17B, 18A and 18B is made of, for example, a metal member such as stainless steel, magnesium, or aluminum, or a fiber-reinforced resin plate containing reinforcing fibers such as carbon fiber, and the like.

The hinge device 14 relatively rotatably connects the chassis 12A and 12B. The hinge device 14 also functions as a rear cover that hides the gap between the edge portions 17Aa and 17Ba formed in the 0-degree posture illustrated in FIG. 1. The display 16 extends across the chassis 12A and 12B.

Hereinafter, for the electronic apparatus 10, description is performed while the direction in which the chassis 12A and 12B are arranged is called an X direction, the direction along the edge portions 17Aa and 17Ba orthogonal to the X direction is called a Y direction, and the thickness direction of the chassis 12A and 12B is called a Z direction. As for the X direction, the direction from the second chassis 12B to the first chassis 12A may be called an X1 direction, and a direction opposite to the X1 direction may be called an X2 direction. As for the angular posture between the chassis 12A and 12B, description is performed while a state in which the chassis 12A and 12B are folded so as to overlap each other in the surface normal direction is called the 0-degree posture (see FIG. 1), and a state in which the chassis 12A and 12B are aligned in a direction perpendicular to the surface normal direction (X direction) is called the 180-degree posture (see FIG. 2). It is possible to call the posture between 0 and 180 degrees by appropriately carving the angle. For example, a state in which the surface normal directions of the chassis 12A and 12B are orthogonal to each other is a 90-degree posture. These angles are for convenience of description, and the actual product may of course have angular positions slightly deviated from the exact angular positions indicated by angle numbers.

Figure 4:
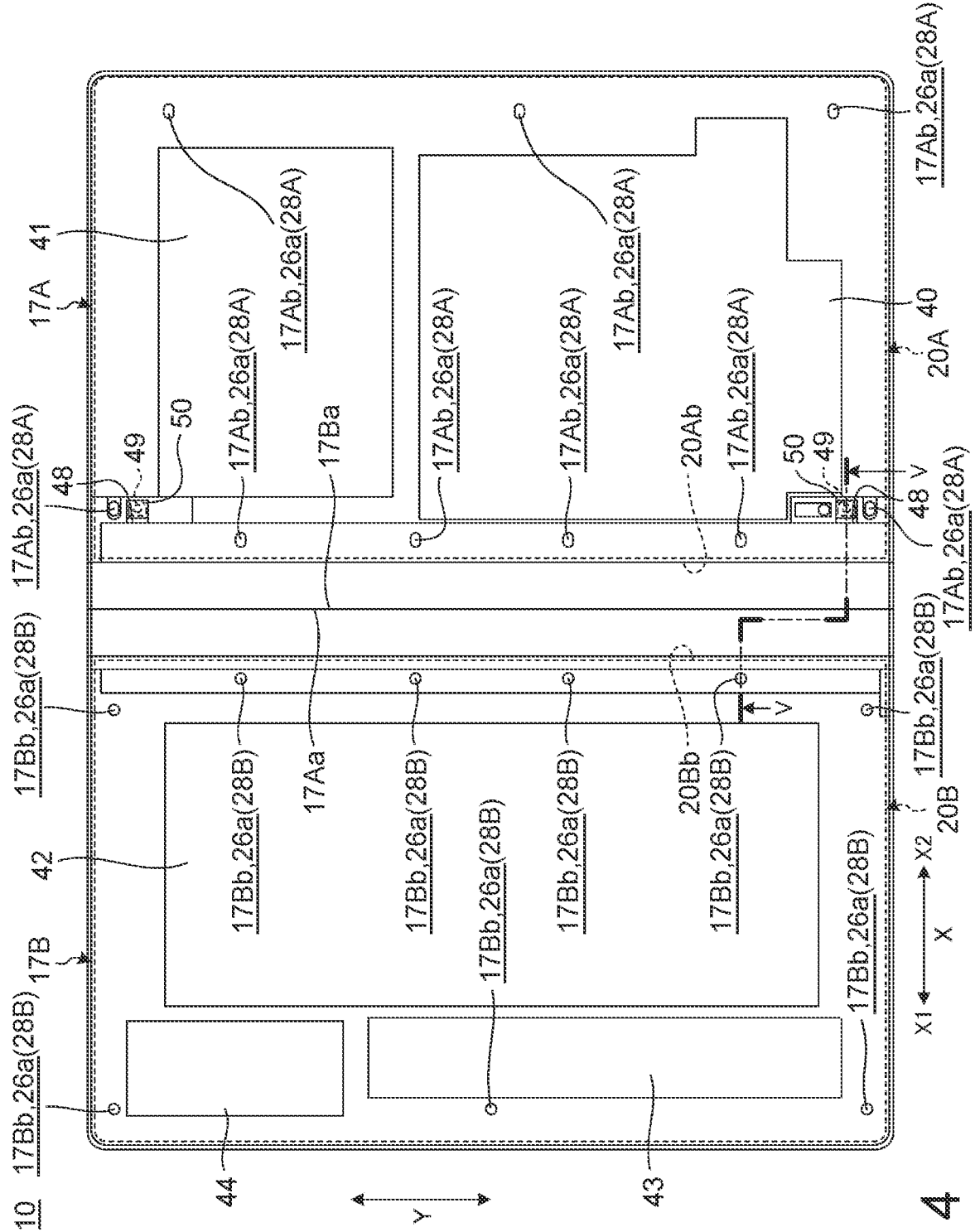
FIG. 4 is a bottom view schematically illustrating the internal structure of the electronic apparatus illustrated in FIG. 3.
Figure 5:
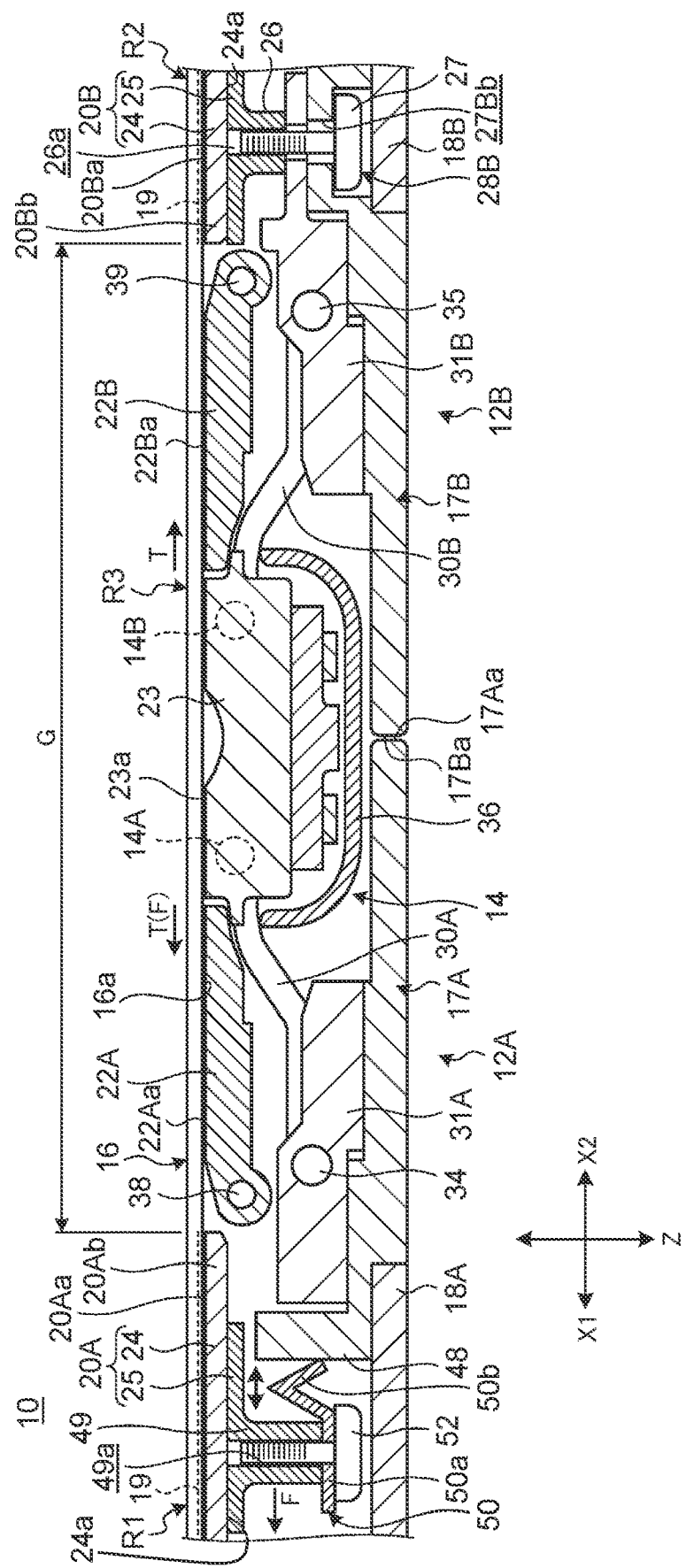
FIG. 5 is a schematic cross-sectional view taken along line V-V in FIG. 4.

FIG. 4 is a bottom view schematically illustrating the internal structure of the electronic apparatus 10 illustrated in FIG. 3. FIG. 4 is a bottom view of the chassis 12A and 12B from which the cover members 18A and 18B are removed. FIG. 5 is a schematic cross-sectional view along line V-V in FIG. 4.

Figure 6:
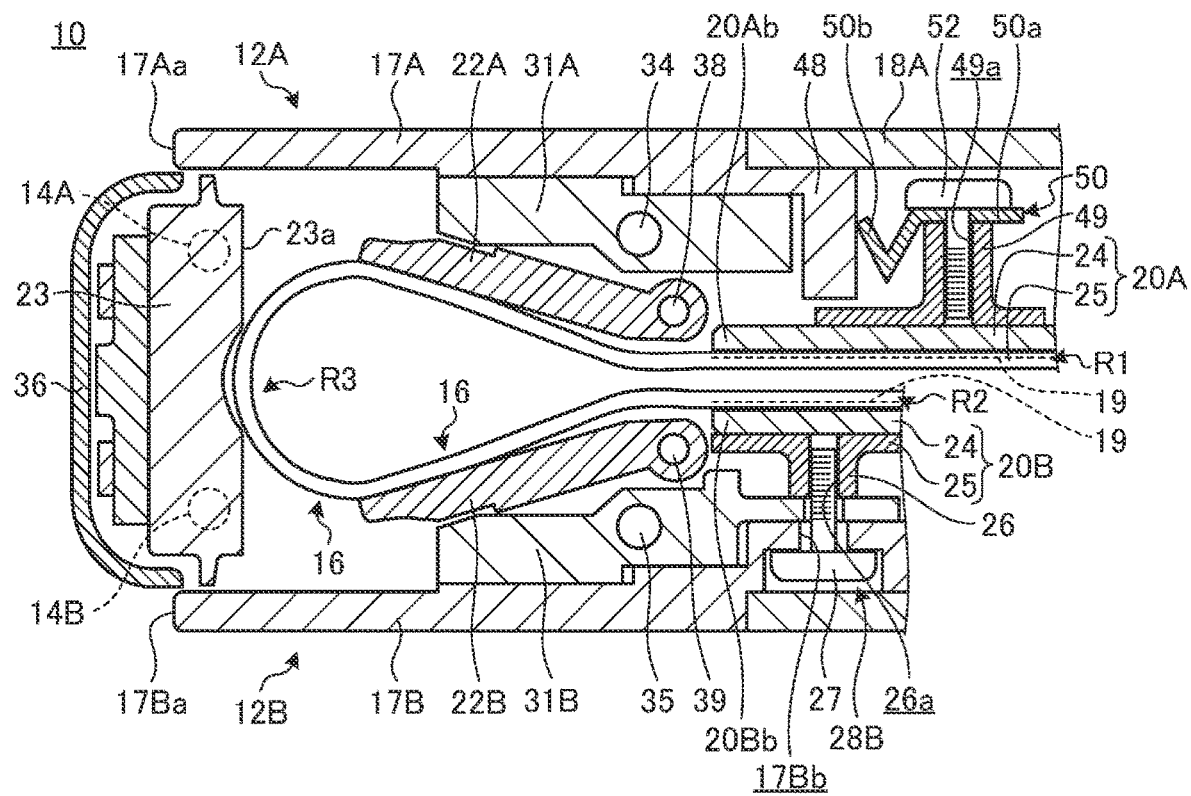
FIG. 6 is a schematic perspective cross-sectional view illustrating a state in which the electronic apparatus illustrated in FIG. 5 is in the 0-degree posture.

FIG. 6 is a schematic perspective cross-sectional view illustrating a state in which the electronic apparatus 10 illustrated in FIG. 5 is in the 0-degree posture.

In the 0-degree posture illustrated in FIGS. 1 and 6, the chassis 12A and 12B are in a state of being folded in half. The display 16 is, for example, a paper-shaped flexible display formed of organic EL. At the 0-degree posture, the display 16 is disposed such that a first region R1 on the side of the first chassis 12A face a second region R2 on the side of the second chassis 12B, which are illustrated in FIG. 2, and a folding region R3, which is a boundary region between the regions R1 and R2, is in a state of being folded in an arc shape. In the 180-degree posture illustrated in FIGS. 2 and 5, the chassis 12A and 12B are disposed side by side with each other. At this time, the display 16 has the regions R1 and R2 and the folding region R3 disposed side by side on a XY plane, and forms a flat plate shape as a whole.

The display 16 has the first region R1 relatively fixed to the first chassis 12A and the second region R2 relatively fixed to the second chassis 12B. Specifically, the rear surface 16a of the first region R1 is fixed to the first chassis 12A via the first plate 20A, and the rear surface 16a of the second region R2 is fixed to the second chassis 12B via the second plate 20B. The folding region R3 of the display 16 is supported by a first support plate 22A, a hinge main body 23, and a second support plate 22B that constitute the hinge device 14.

As illustrated in FIGS. 3 to 6, the plates 20A and 20B are disposed on the left and right with the hinge device 14 interposed therebetween, and support the rear surface 16a of the display 16 with the respective front surfaces 20Aa and 20Ba. The rear surface 16a of the display 16 has the first region R1 fixed to the front surface 20Aa of the first plate 20A and a second region R2 fixed to the front surface 20Ba of the second plate 20B. The regions R1 and R2 are fixed to the plates 20A and 20B using an adhesive material 19 such as double-sided tape (see FIG. 5).

The plates 20A and 20B are composed of a base plate 24 and a metal frame 25. The base plate 24 is, for example, a carbon fiber reinforced resin plate in which carbon fibers are impregnated with a matrix resin such as epoxy resin. The metal frame 25 is formed of, for example, magnesium alloy or the like, and fixed to the outer peripheral edge portion of the rear surface 24a of the base plate 24. Since the plates 20A and 20B are carbon fiber reinforced resin plates, it is possible to secure high flatness and to reduce thickness and weight. However, the carbon fiber reinforced resin plate has a concern that the carbon fibers may come off from the outer peripheral end surface (edge) in powder shapes, and shape processing and screw processing are also difficult. Therefore, the plates 20A and 20B are fixed to the metal frame 25 with an adhesive or the like so as to surround the outer peripheral end surface of the base plate 24 and the outer edge portion of the rear surface 24a.

The first plate 20A is supported by the first chassis member 17A. The second plate 20B is supported by the second chassis member 17B. In the 180-degree posture illustrated in FIG. 5, the plates 20A and 20B are aligned in the X direction with a gap G between the edge portions 20Ab and 20Bb facing each other. The folding region R3 of the display 16 is disposed to straddle the gap G, and the rear surface 16a of the display 16 is supported by the hinge device 14 disposed to fill the gap G.

The metal frame 25 of the first plate 20A is formed with a plurality of bosses 26. Each boss 26 has, for example, a truncated cone shape, and is provided with a screw hole 26a having a female screw formed on the inner peripheral surface thereof. Each boss 26 is provided so as to protrude from the rear surface 24a of the base plate 24, and is arranged along the outer peripheral edge portion of the first plate 20A. Although FIG. 5 illustrates only the specific structures of the boss 26 and the screw hole 26a on the side of the second plate 20B, the structures of the boss 26 and the screw hole 26a on the side of the first plate 20A may be the same or similar.

Figure 7:
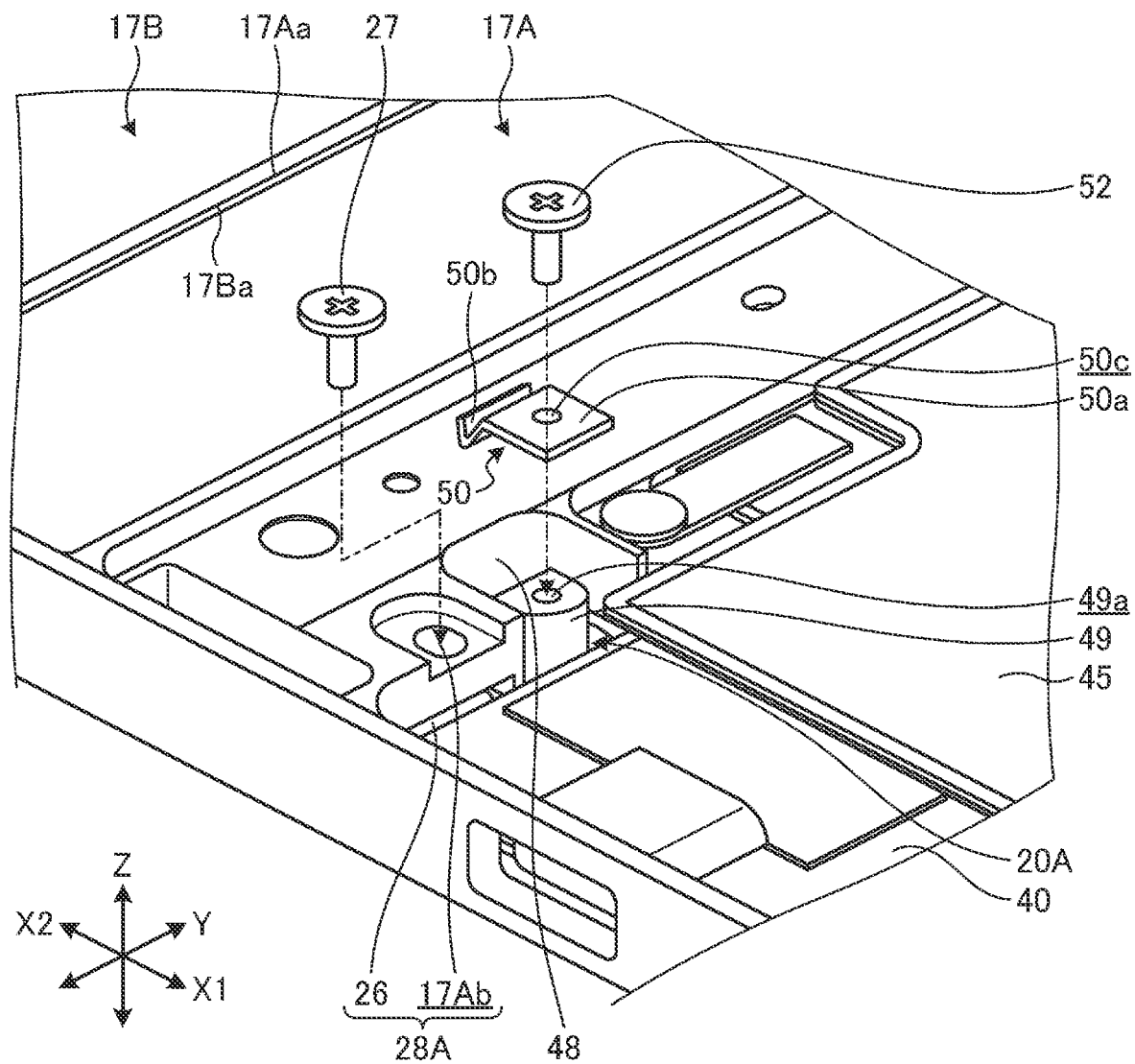
FIG. 7 is an enlarged perspective view of parts of a first chassis member and a first plate illustrated in FIG. 4.

The first chassis member 17A has substantially oval-shaped long holes 17Ab extending in the X direction at positions overlapping the respective screw holes 26a (see FIGS. 4 and 7). Screws 27 are inserted through the respective long holes 17Ab and screwed into the respective screw holes 26a (see FIG. 7). As a result, the first plate 20A is fastened and fixed to the first chassis member 17A using the screws 27. That is, the screw holes 26a, the long holes 17Ab, and the screws 27 constitute a first fastening portion 28A that fastens the first plate 20A to the first chassis member 17A.

Similarly, the metal frame 25 of the second plate 20B is also provided with a plurality of bosses 26 that form the screw holes 26a (see FIG. 5). However, the second chassis member 17B has perfect circle-shaped hole portions 17Bb at positions overlapping the respective screw holes 26a of the second plate 20B (see FIG. 4). The second plate 20 is fastened and fixed to the second chassis member 17B by the screws 27 screwed into the screw holes 26a through the respective hole portions 17Bb. That is, the screw hole 26a, the hole portion 17Bb, and the screw 27 constitute a second fastening portion 28B that fastens the second plate 20B to the second chassis member 17B.

The base plate 24 may be formed of a metal material or a resin material instead of the carbon fiber reinforced resin plate. In this case, the metal frame 25 may be omitted and the screw holes 26a may be provided in the base plate 24.

As illustrated in FIGS. 5 and 6, the folding region R3 of the display 16 is capable of relatively moving with respect to the chassis 12A and 12B. In the 180-degree posture, the rear surface 16a of the folding region R3 is supported by the hinge main body 23 and the support plates 22A and 22B. In the 0-degree posture, the folding region R3 is folded in an arc shape, a part of the rear surface 16a is supported by the support plates 22A and 22B, and most parts of the rear surface 16a are separated from the hinge device 14.

As illustrated in FIGS. 3, 5 and 6, the hinge device 14 of the present embodiment has a hinge main body 23, a first support plate 22A, and a second support plate 22B.

The hinge main body 23 is provided at a position straddling the edge portions 17Aa and 17Ba of the chassis 12A and 12B, and extends over the substantially entire length in the Y direction along the edge portions 17Aa and 17Ba. The hinge main body 23 is a block-shaped component formed of a metal material such as aluminum. The hinge main body 23 supports two hinge shafts 14A and 14B aligned in the X direction in the 180-degree posture.

A first end portion of a first link arm 30A is rotatably supported on the first hinge shaft 14A. A first end portion of a second link arm 30B is rotatably supported on the second hinge shaft 14B. The link arms 30A and 30B have a boomerang-shaped curved shape that gradually approaches the inner surfaces 12Ab and 12Bb of the chassis 12A and 12B in a direction separated from the hinge shafts 14A and 14B.

A second end portion of the first link arm 30A is connected to a first bracket 31A using a rotation shaft 34 so as to be relatively rotatable. The first bracket 31A is fastened to the first chassis member 17A using the screws 27, together with the first plate 20A. A second end portion of the second link arm 30B is connected to a second bracket 31B using a rotation shaft 35 so as to be relatively rotatable. The second bracket 31B is fastened to the second plate 20B using the screws 27, together with the second chassis member 17B. Although FIG. 5 illustrates only the structure for fixing the second bracket 31B to the second chassis member 17B, the structure for fixing the first bracket 31A to the first chassis member 17A may be the same or similar except that the structure is bilaterally symmetrical.

A plurality of link arms 30A and 30B and brackets 31A and 31B are aligned along a longitudinal direction (Y direction) of the hinge main body 23 (see FIG. 3). Thereby, the hinge main body 23 relatively rotatably connects the chassis 12A and 12B. A gear mechanism synchronizing rotational movement between the chassis 12A and 12B and a torque mechanism for applying a predetermined rotational torque to the rotational movement between the chassis 12A and 12B are also provided in the hinge main body 23. A rear cover component 36 serving as a decorative cover is attached to an outer surface of the hinge main body 23.

In the 180-degree posture illustrated in FIG. 5, the hinge main body 23 supports the rear surface 16a of the folding region R3 of the display 16 with the front surface 23a of the hinge main body 23. At this time, the hinge main body 23 and the rear cover component 36 are accommodated in the chassis 12A and 12B, and disposed to straddle the edge portions 17Aa and 17Ba that are close to or in contact with each other in the X direction. In the 0-degree posture illustrated in FIG. 6, the hinge main body 23 and the rear cover component 36 are disposed so as to close the gap between the inner surfaces of the edge portions 17Aa and 17Ba that are widely separated apart, and become the rear cover of the electronic apparatus 10 that is folded like a book. At this time, the electronic apparatus 10 prevents deterioration of an appearance design by exposing the rear cover component 36 to the outermost surface (see also FIG. 1).

The support plates 22A and 22B are plates formed of a metal material such as aluminum, and have bilaterally symmetrical shapes. The support plates 22A and 22B are provided on the sides of the inner surfaces 12Ab and 12Bb of the chassis 12A and 12B, and extend over the substantially entire length in the Y direction along the edge portions 17Aa and 17Ba.

The first support plate 22A is disposed between the first plate 20A and the hinge main body 23. The first support plate 22A has an edge portion on the side of the first plate 20A, which is connected to the first bracket 31A so as to be relatively rotatable via a rotation shaft 38. The first support plate 22A has an edge portion on the side of the hinge main body 23, which is relatively movable with respect to the hinge main body 23. The second support plate 22B is disposed between the second plate 20B and the hinge main body 23. The second support plate 22B has an edge portion on the side of the second plate 20B, which is connected to the second bracket 31B so as to be relatively rotatable via a rotation shaft 39. The second support plate 22B has an edge portion on the side of the hinge main body 23 so as to be relatively movable with respect to the hinge main body 23.

The support plates 22A and 22B swing around the rotation shafts 38 and 39 as a center of the rotation in accordance with the rotational movement of the chassis 12A and 12B. In the 180-degree posture, the support plates 22A and 22B support the rear surface 16a of the folding region R3 of the display 16 by the front surfaces 22Aa and 22Ba of the support plates 22A and 22B. In the angular postures other than 180 degrees, the support plates 22A and 22B come into contact with the display 16 in a state in which a gap is provided between the support plates 22A and 22B and the display 16 or with a slight force that does not deform the display 16 (see FIG. 6).

As illustrated in FIG. 4, the first chassis 12A is equipped with a motherboard 40 on which a CPU is mounted, a sub battery device 41, and various electronic components. For example, a main battery device 42, a display board 43, a sub card 44, and various electronic components are mounted in the second chassis 12B. The display board 43 is a control board of the display 16. The sub card 44 is a board on which, for example, a power button, an external connector conforming to a Universal Serial Bus (USB) standard, and the like are mounted. Reference numeral 45 in FIG. 7 denotes a heat spreader formed of a copper plate or the like and disposed so as to cover the motherboard 40.

In the electronic apparatus 10 configured as described above, the folding region R3 of the display 16 is not fixed to other members. For this reason, in the 180-degree posture illustrated in FIG. 5, the folding region R3 is in a state of being placed only on the front surfaces 22Aa, 22Ba, and 23a of the hinge device 14 at the gap G between the plates 20A and 20B. For this reason, there is a concern that the folding region R3 produces protruding wrinkles and waves, thereby degrading visibility and appearance quality. In this regard, the electronic apparatus 10 of the present embodiment applies a tension T that is pulled in a width direction (X direction) to the folding region R3, thereby suppressing the occurrence of wrinkles and waves.

Therefore, next, a structure for applying the tension T to the folding region R3 of the display 16 will be described. FIG. 7 is an enlarged perspective view of parts of the first chassis member 17A and the first plate 20A illustrated in FIG. 4.

As illustrated in FIGS. 4 to 7, the electronic apparatus 10 includes a first receiving portion 48 provided on the first chassis member 17A, a second receiving portion 49 provided on the first plate 20A, and a pressing member 50 interposed between the receiving portions 48 and 49.

The first receiving portion 48 is a standing wall protruding upward from the inner surface of the first chassis member 17A. The first receiving portion 48 is provided below the edge portion 20Ab of the first plate 20A, that is, at a position close to the hinge device 14. That is, the first receiving portion 48 is located at a position that avoids the hinge device 14 in the X direction width of the first chassis member 17A and is closest to a side of the first edge portion 17Aa.

The second receiving portion 49 is formed on the metal frame 25 of the first plate 20A. The second receiving portion 49 protrudes from the rear surface 24a of the base plate 24 and has, for example, a truncated cone shape. The second receiving portion 49 is disposed on the X1 side of the first receiving portion 48 with a predetermined gap, and faces a side surface of the first receiving portion 48 on the X1 side. The second receiving portion 49 is provided with a screw hole 49a having a female screw formed on the inner peripheral surface thereof.

The pressing member 50 is a metal leaf spring formed of a stainless-steel plate or the like. The pressing member 50 has a base portion 50a and a spring portion 50b.

The base portion 50a has a through hole 50c, through which the screw 52 is inserted, substantially in the center. The screw 52 is inserted through the through hole 50c and screwed into the screw hole 49a of the second receiving portion 49. As a result, the base portion 50a is fastened to a tip end surface of the second receiving portion 49.

The spring portion 50b protrudes in the X2 direction from the base portion 50a and is bent in a substantially V shape when viewed from the side. Therefore, the spring portion 50b has a predetermined elasticity. The tip end of the spring portion 50b comes into contact with the first receiving portion 48 in a protruding direction from the base portion 50a. The spring portion 50b may have, for example, a wavy shape or an arc-like curved shape other than the V-shaped bent shape.

As a result, the pressing member 50 generates a pressing force F in a direction to move the first plate 20A relative to the first chassis member 17A in the X1 direction. That is, the pressing member 50 presses the first plate 20A toward a separation direction (X1 direction) in which the first plate 20A is separated from the second plate 20B. As a result, the first plate 20A is fixed to the first chassis member 17A by the first fastening portion 28A in a state in which the pressing member 50 applies the pressing force F in a direction separated from the second plate 20B. In addition, the second plate 20B is fixed to the second chassis member 17B by the second fastening portion 28B.

Therefore, in the 180-degree posture illustrated in FIGS. 3 to 5, the display 16 is in a state of being pulled in the X1 direction in which the first region R1 fixed to the first plate 20A is separated from the second region R2 fixed to the second plate 20B. As a result, the folding region R3 of the display 16 is stretched by applying the tension T in the X direction, which is the width direction, thereby being a state in which the occurrence of wrinkles and waves are suppressed. Thus, the pressing member 50 is capable of applying the tension T to the folding region R3 of the display 16 via the first plate 20A.

Next, a method of manufacturing the electronic apparatus 10 will be described, particularly by exemplifying a method of assembling the display 16 to the chassis members 17A and 17B.

First, a display assembly is formed by fixing the regions R1 and R2 of the display 16 to the plates 20A and 20B with the adhesive material 19. At this time, the gap G is formed between the edge portions 20Ab and 20Bb of the plates 20A and 20B.

Next, such a display assembly is fixed to chassis members 17A and 17B. The chassis members 17A and 17B are previously assembled with the hinge device 14 and connected to each other so as to be relatively rotatable.

First, the second fastening portion 28B is fastened to fix the second plate 20B to the second chassis member 17B. The hole portion 17Bb of the second chassis member 17B has a perfect circle shape. For this reason, the second fastening portion 28B is capable of accurately positioning and fixing the second plate 20B and the second chassis member 17B.

Next, the pressing member 50 is used to temporarily fix the first plate 20A to the first chassis member 17A. That is, the pressing member 50 is fixed to the second receiving portion 49 of the first plate 20A using the screw 52, and the spring portion 50b is stretched between the receiving portions 48 and 49 which face each other. Here, the display 16 is in a state in which the first region R1 is fixed to the first plate 20A, the second region R2 is fixed to the second plate 20B, and the folding region R3 is free. For this reason, the pressing member 50 is locked to the first receiving portion 48 in a state in which the folding region R3 is pulled by the first plate 20A. That is, the first plate 20A is temporarily fixed to the first chassis member 17A in a state of receiving the pressing force F in the X1 direction in which the first plate 20A is separated from the second plate 20B. At this time, the folding region R3 of the display 16 receives the tension T in a direction of being pulled in the X direction.

Finally, the first fastening portion 28A is fastened to fix the first plate 20A to the first chassis member 17A. Here, the long hole 17Ab of the first chassis member 17A extends in the X direction. That is, the first fastening portion 28A is capable of fixing the first plate 20A and the first chassis member 17A with a predetermined adjustment width in the X direction. For this reason, the first plate 20A receives the pressing force F from the pressing member 50, and is capable of being securely fixed to the first chassis member 17A at a desired X direction position in a state of being forced in the X1 direction with respect to the first chassis member 17A.

Therefore, a step of assembling the display 16 to the chassis members 17A and 17B is completed. After that, the motherboard 40, the battery devices 41 and 42, and the like are attached to the chassis members 17A and 17B before and after the assembly step, and wiring is connected as appropriate. The manufacture of the electronic apparatus 10 is completed by fixing the cover members 18A and 18B to the chassis members 17A and 17B.

As described above, the electronic apparatus 10 of the present embodiment includes the display 16 that is formed in a flexible sheet shape, and has the first region R1 fixed to the front surface 20Aa of the first plate 20A, the second region R2 fixed to the front surface 20Ba of the second plate 20B, and the folding region R3 capable of being folded and provided to straddle the gap G between the plates 20A and 20B between the regions R1 and R2. Furthermore, the electronic apparatus 10 includes the first fastening portion 28A that fixes the first plate 20A to the first chassis member 17, the second fastening portion 28B that fixes the second plate 20B to the second chassis member 17B, and the pressing member 50 that applies the tension T to the folding region R3 of the display 16 by pressing the first plate 20A against the first chassis member 17A in the separation direction separated from the second plate 20B.

Therefore, when the electronic apparatus 10 is in the 180-degree posture, the folding region R3 of the display 16 is stretched by applying the tension T in the X direction, so that the occurrence of wrinkles and waves is suppressed. In particular, although the electronic apparatus 10 has a configuration in which the gap G is provided between the plates 20A and 20B, the pressing force F in the separation direction is securely applied between the plates 20A and 20B using the pressing force F of the pressing member 50, so that it is possible to applying the tension T to the folding region R3, which straddles the gap G, of the display 16.

As illustrated in FIGS. 3 and 4, a plurality of pressing members 50 are provided along the edge portion 20Ab of the first plate 20A. In the present embodiment, the pressing members 50 are provided near both ends of the edge portion 20Ab in the Y direction, and a total of two pressing members 50 are provided. The receiving portions 48 and 49 are also provided at respective positions corresponding to the respective pressing members 50. As a result, the first plate 20A receives the pressing force F simultaneously from the plurality of pressing members 50 arranged in the Y direction.

Therefore, the electronic apparatus 10 is capable of more evenly applying the tension T to the folding region R3 in the Y direction and prevent the first plate 20A from rotating on the XY plane.

As illustrated in FIGS. 3 and 4, the pressing member 50 may be disposed at a position closer to the side of the second plate 20B than the center of the first plate 20A in the width direction of the X direction, preferably a position close to the end surface of the edge portion 20Ab as much as possible. That is, the electronic apparatus 10 has a configuration in which the folding region R3 is pulled by the first plate 20A. For this reason, a configuration is assumed in which the pressing member 50 that applies the pressing force F to the first plate 20A is installed at a position far from the folding region R3. In the configuration, the tension T is applied to the folding region R3 in a state in which the manufacturing tolerance of the X direction width of the first plate 20A, the intersection between the receiving portions 48 and 49, slight misalignment, and the like are enlarged, so that a possibility is assumed in which the tension T of the folding region R3 increases or decreases excessively. Therefore, when the pressing member 50 is installed at a position as close as possible to the folding region R3, the tension T applied to the folding region R3 is easily adjusted, so that it is possible to suppress the occurrence of wrinkles and waves with higher accuracy.

The pressing member 50 is an elastic member having the spring portion 50b. For this reason, the pressing member 50 always continues to apply the pressing force F to the first plate 20A even after the first fastening portion 28A is fastened. For this reason, in the electronic apparatus 10, even when the fastening state of the first fastening portion 28A is loosened, the pressing member 50 continues to apply the tension T to the folding region R3, so that it is possible to suppress the occurrence of the wrinkles and waves for a long period of time.

In the electronic apparatus 10, the first fastening portion 28A fixes between the first plate 20A and the first chassis member 17A with an adjustment width in the X direction corresponding to the length of the long hole 17Ab. On the other hand, the second fastening portion fixes between the plate 20B and the second chassis member 17B with substantially no adjustment width in the X direction. For this reason, it is possible to position and fix the second plate 20B, to which the pressing member 50 is not attached, to the second chassis member 17B with higher accuracy. Also, it is possible to fix the first plate 20A, which needs position adjustment by the pressing member 50, to the first chassis member 17A within the range of the adjustment width of the long hole 17Ab. For this reason, it is possible to fix the first plate 20A to the first chassis member 17A in a state of more securely holding the tension T of the folding region R3 by the pressing member 50.

Figure 8:
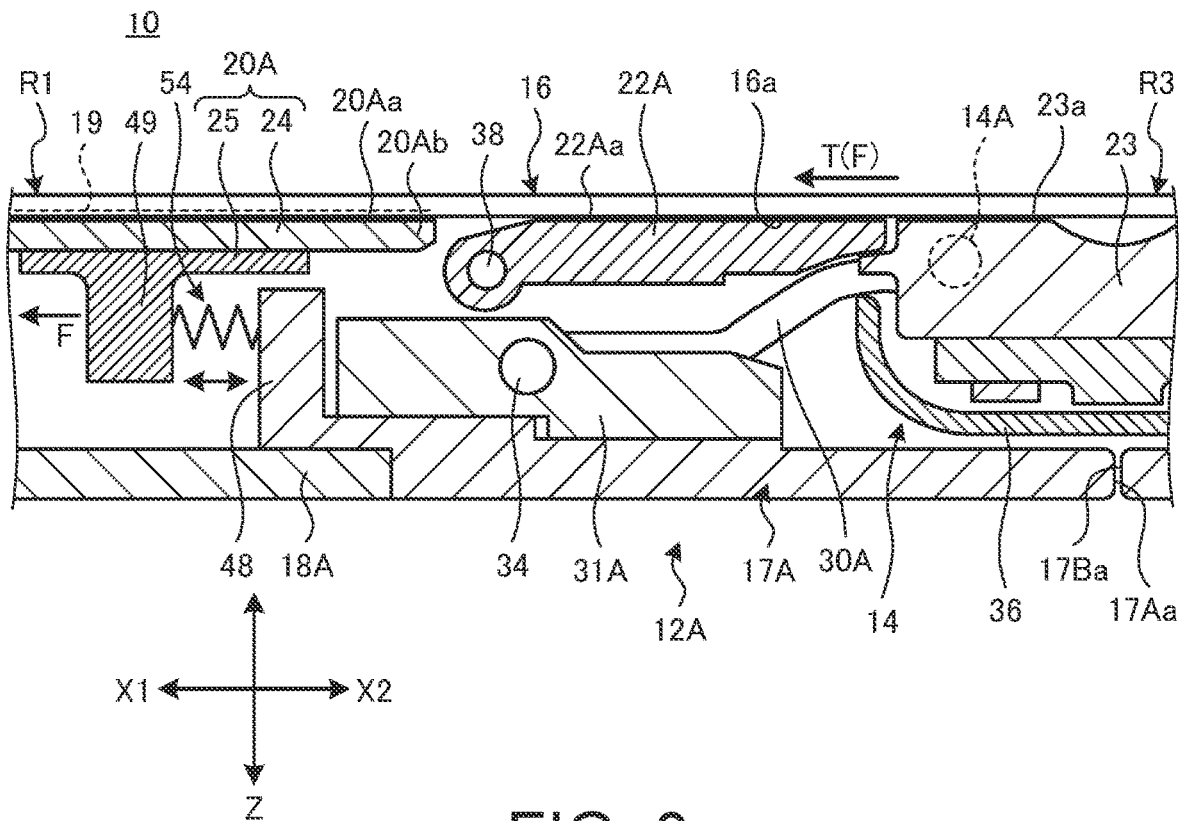
FIG. 8 is an enlarged schematic side cross-sectional view of a main part of an electronic apparatus including a pressing member according to a first modification example.

FIG. 8 is an enlarged schematic side cross-sectional view of a main part of an electronic apparatus 10 including a pressing member 54 according to a first modification example.

The pressing member 54 illustrated in FIG. 8 is different from the pressing member 50 illustrated in FIG. 5 in a fact that the pressing member 54 is an elastic member composed of a coil spring instead of the leaf spring. In this case, the second receiving portion 49 may be configured as a protrusion without the screw hole 49a. The pressing member 54 is in a state in which the respective end portions of the coil spring are locked with the receiving portions 48 and 49 respectively, thereby being compressed between the receiving portions 48 and 49. Therefore, it is possible for such a pressing member 54 to apply the pressing force F to the first plate 20A and to apply the tension T to the folding region R3.

Figure 9:
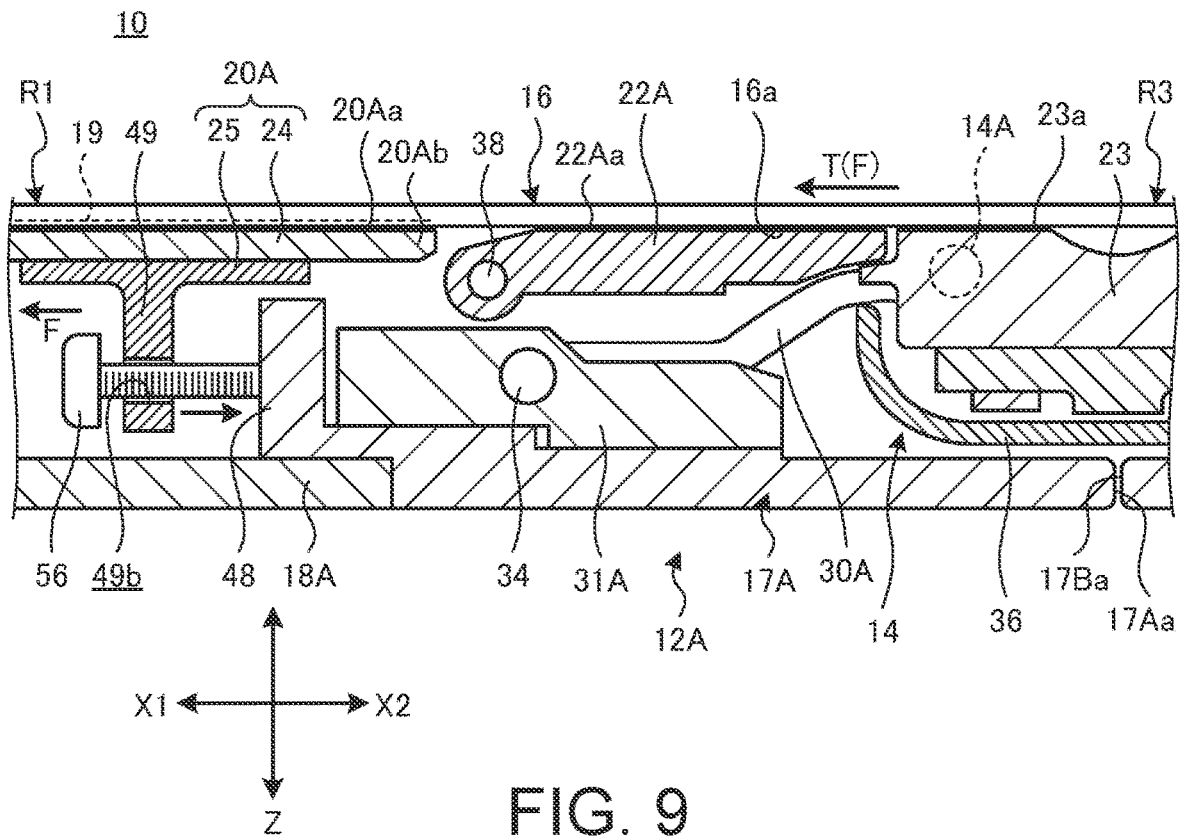
FIG. 9 is an enlarged schematic side cross-sectional view of a main part of an electronic apparatus including a pressing member according to a second modification example.

FIG. 9 is an enlarged schematic side cross-sectional view of a main part of an electronic apparatus 10 including a pressing member 56 according to a second modification example.

The pressing member 56 illustrated in FIG. 9 is composed of a rigid screw instead of an elastic member such as the pressing member 50 illustrated in FIG. 5. At this time, the second receiving portion 49 has the screw hole 49b that penetrates laterally along the X direction. The pressing member 56 is inserted into the screw hole 49b of the second receiving portion 49 in a state of being screwed into the screw hole 49b, and has a tip end that abuts against the first receiving portion 48. Therefore, it is possible for such a pressing member 56 to apply the pressing force F to the first plate 20A and to apply the tension T to the folding region R3 by adjusting the tightening amount with respect to the screw hole 49b.

Figure 10A:
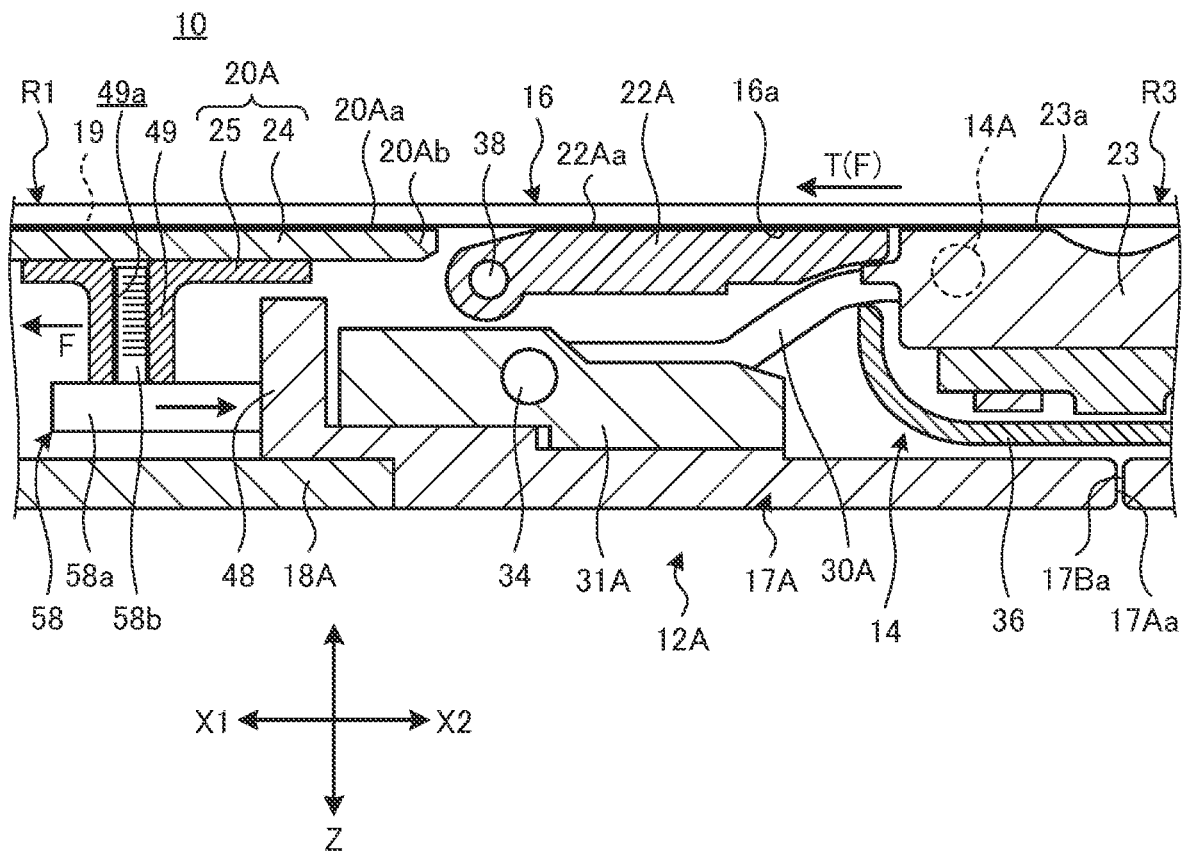
FIG. 10A is an enlarged schematic side cross-sectional view of a main part of an electronic apparatus including a pressing member according to a third modification example.
Figure 10B:
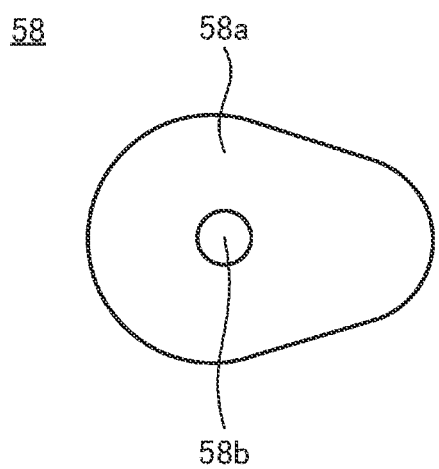
FIG. 10B is a schematic plan view of the pressing member illustrated in FIG. 10A.

FIG. 10A is an enlarged schematic side cross-sectional view of a main part of an electronic apparatus 10 including a pressing member 58 according to a third modification example. FIG. 10B is a schematic plan view of the pressing member 58.

The pressing member 58 illustrated in FIGS. 10A and 10B has a rigid cam 58a and a screw portion 58b instead of the elastic member such as the pressing member 50 illustrated in FIG. 5. The cam 58a is a cam member having a substantially oval shape or a substantially triangular shape. The screw portion 58b protrudes from one surface of the cam 58a and is in an eccentric position. The pressing member 58 is fixed to the second receiving portion 49 by screwing the screw portion 58b into the screw hole 49a of the second receiving portion 49. At this time, the outer peripheral surface of the cam 58a is pressed against the first receiving portion 48. Therefore, the pressing member 58 adjusts the contact position of the outer peripheral surface of the cam 58a with respect to the first receiving portion 48, thereby enabling the pressing force F to be applied to the first plate 20A and the tension T to be applied the folding region R3.

The present invention is not limited to the above-described embodiments, and modification is freely possible without departing from the gist of the present invention.

In the above, the electronic apparatus 10 that is capable of being folded in half like a book is exemplified. It is possible to apply the present invention to, in addition to a configuration of folding the same-shaped chassis in half, for example, various configurations, such as a double-door configuration in which small chassis are foldably connected to the left and right edge portions of a large chassis, a configuration, S-shaped folding configuration in which chassis with different folding directions are connected to the left and right edge portions of one chassis, and a J-shaped folding configuration in which a small chassis is foldably connected to one of the left and right edge portions of a large chassis, and the number of chassis to be connected may be four or more.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS 10 electronic apparatus
12A first chassis
12B second chassis
14 hinge device
16 display
17A first chassis member
17B second chassis member
20A first plate
20B second plate
28A first fastening portion
28B second fastening portion
48 first receiving portion
49 second receiving portion
50, 54, 56, 58 pressing member

What is claimed is:

1. An electronic apparatus comprising:
a first chassis member;
a second chassis member that is adjacent to the first chassis member and relatively rotatably connected to the first chassis member;
a first plate that is supported by the first chassis member;
a second plate that is supported by the second chassis member and aligned with a gap between the first plate and the second plate;
a display that is formed in a flexible sheet shape, and has a first region fixed to a front surface of the first plate, a second region fixed to a front surface of the second plate, and a folding region capable of being folded and provided to straddle a gap between the first region and the second region;
a first fastening portion that fixes the first plate to the first chassis member;
a second fastening portion that fixes the second plate to the second chassis member; and
one or more pressing members that apply tension to the folding region of the display by pressing the first plate to the first chassis member toward a separation direction separated from the second plate, wherein
the first chassis member has a first receiving portion,
the first plate has a second receiving portion that faces the first receiving portion, and
each of the one or more pressing members is either:
a leaf spring that has a base portion fixed to the second receiving portion and a spring portion protruding from the base portion to be pressed against the first receiving portion, or
a screw or a cam that applies a pressing force in the separation direction between the first receiving portion and the second receiving portion.

2. The electronic apparatus according to claim 1, wherein each of the one or more pressing members presses the first plate to the first chassis member at a position closer to the second plate than a center of the first plate in a width direction along the separation direction.

3. The electronic apparatus according to claim 2, wherein
the first plate has an edge portion extending in a direction orthogonal to the separation direction and facing the gap, and
a plurality of the pressing members are disposed along the edge portion.

4. The electronic apparatus according to claim 1, wherein
the first fastening portion is capable of fixing relative positions of the first plate and the first chassis member in the separation direction with a predetermined adjustment width, and
the second fastening portion fixes relative positions of the second plate and the second chassis member in the separation direction with substantially no adjustment width.

5. The electronic apparatus according to claim 4, wherein the first fastening portion has
- a long hole that is provided in the first chassis member and extends along the separation direction,
- a screw hole that is provided in the first plate, and
- a screw that is screwed into the screw hole through the long hole.

6. The electronic apparatus according to claim 1, further comprising:
- a hinge device that relatively rotatably connects the first chassis member and the second chassis member between a first posture in which the first chassis member and the second chassis member are folded so as to overlap each other in a surface normal direction and a second posture in which the first chassis member and the second chassis member are arranged in a direction perpendicular to the surface normal direction, wherein
- in the second posture, the hinge device is disposed to fill the gap between the first plate and the second plate and supports the folding region of the display.

7. A method for manufacturing an electronic apparatus including a first chassis member and a second chassis member that are relatively rotatably connected to each other, the method comprising:
- a first step of fixing a first region of a display formed in a flexible sheet shape to a front surface of a first plate, fixing a second region to a front surface of a second plate arranged with a gap between the first plate and the second plate, and causing a state in which a folding region capable of being folded straddles a gap between the first region and the second region;
- a second step of fixing the second plate to the second chassis member after the first step;
- a third step of pressing the first plate to the first chassis member toward a separation direction separated from the second plate by attaching one or more pressing members to the first plate, and applying tension to the folding region of the display after the second step; and
- a fourth step of fixing the first plate to the first chassis member in a state in which the tension is still applied to the folding region of the display after the third step, wherein the first chassis member has a first receiving portion,
the first plate has a second receiving portion that faces the first receiving portion, and
each of the one or more pressing members is either:
- a leaf spring that has a base portion fixed to the second receiving portion and a spring portion protruding from the base portion to be pressed against the first receiving portion, or
- a screw or a cam that applies a pressing force in the separation direction between the first receiving portion and the second receiving portion.

* * * * *